(12) United States Patent
Singh et al.

(10) Patent No.: US 6,845,345 B1
(45) Date of Patent: *Jan. 18, 2005

(54) SYSTEM FOR MONITORING AND ANALYZING DIAGNOSTIC DATA OF SPIN TRACKS

(75) Inventors: Bhanwar Singh, Morgan Hill, CA (US); Michael K. Templeton, Atherton, CA (US); Ramkumar Subramanian, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 655 days.

This patent is subject to a terminal disclaimer.

(21) Appl. No.: 09/777,435

(22) Filed: Feb. 6, 2001

(51) Int. Cl.[7] .............................................. G06F 11/00
(52) U.S. Cl. ........................... 702/188; 702/57; 702/81; 702/123; 702/188; 714/742; 714/738; 714/724; 700/108; 700/121; 382/141; 382/144; 382/151
(58) Field of Search ............................... 702/57, 81–82, 702/84, 122–123, 182–188, FOR 104, 135, 137, 170, 171; 378/34, 35; 714/724–745; 700/108, 121; 382/141–152

(56) References Cited

U.S. PATENT DOCUMENTS

| | | | |
|---|---|---|---|
| 4,918,595 A | * | 4/1990 | Kahn et al. .................. 718/102 |
| 4,979,055 A | * | 12/1990 | Squires et al. ................. 360/69 |
| 5,635,409 A | | 6/1997 | Moslehi .......................... 438/7 |
| 5,969,639 A | | 10/1999 | Lauf et al. ............... 340/870.17 |
| 6,052,653 A | * | 4/2000 | Mazur et al. .................. 702/57 |
| 6,126,744 A | | 10/2000 | Hawkins et al. ............... 117/85 |
| 6,142,660 A | | 11/2000 | Utsunomiya et al. .. 364/468.28 |
| 6,177,133 B1 | | 1/2001 | Gurer et al. ................. 427/240 |
| 6,279,108 B1 | * | 8/2001 | Squires et al. ............... 712/244 |
| 6,332,110 B1 | * | 12/2001 | Wolfe ........................... 702/22 |
| 6,513,151 B1 | * | 1/2003 | Erhardt et al. ................. 716/21 |

OTHER PUBLICATIONS

Pierce, 'Golden Nuggets of AMHS Modeling and Design for Semiconductor Wafer Fabrication', Jan. 1994, IEEE, pp. 200–204.*

Sandia National Laboratories, 'BMP, Best Manufacturing Practices', May 1995, College Park Maryland, pp. 1–58.*

* cited by examiner

*Primary Examiner*—Marc S. Hoff
*Assistant Examiner*—Elias Desta
(74) *Attorney, Agent, or Firm*—Amin & Turocy, LLP (57) ABSTRACT

A system for analyzing diagnostic information associated with a spin track is provided. The system includes one or more analysis systems that collect diagnostic information from one or more spin tracks. The system further includes one or more maintenance systems that schedule routine and/or special maintenance based on analysis of the diagnostic information. An alternative aspect of the system further includes one or more control information systems that generate of feedback control information employed in adapting the processes performed by the spin track.

41 Claims, 7 Drawing Sheets

SYSTEM FOR MONITORING AND ANALYZING DIAGNOSTIC DATA OF SPIN TRACKS

TECHNICAL FIELD

The present invention relates generally to semiconductor processing, and in particular to a system for monitoring and analyzing diagnostic data associated with spin tracks.

BACKGROUND

In the semiconductor industry, there is a continuing trend toward higher device densities. To achieve these high densities there have been, and continue to be, efforts toward scaling down device dimensions (e.g., at submicron levels) on semiconductor wafers. In order to accomplish such high device packing densities, smaller and smaller features sizes are required. To enable such scaling down of device dimensions, sophisticated machines, including spin tracks, are employed in fabricating semiconductors. Such spin tracks can be involved in one or more steps in semiconductor fabrication. Maintaining the spin tracks is important in achieving and maintaining quality in semiconductor manufacturing.

Conventionally, spin tracks may not generate diagnostic information concerning the operation of the machine or, if such diagnostic information is generated, it may be stored locally in the machine, and may require a separate process or machine to analyze the data. Human interactions may be required to determine whether maintenance is required on the spin track. Such interactions may occur locally on each spin track by maintenance personnel of varying skill and experience, resulting in disparate maintenance on spin tracks.

A spin track is a sophisticated machine employed in semiconductor fabrication. A spin track may be employed, for example, for fabrication tasks including, but not limited to, depositing photo resist, depositing oxide, removing edge beads, heating and cooling wafers and cleaning wafers. A spin track may spin a wafer at a high rate of speed to facilitate uniformly coating a wafer with a desired material. A spin track may be damaged by factors including, but not limited to, vibration, contaminated deposition materials, repetitive heating and cooling, electrical surges, build up of deposition and/or cleaning materials, and wear and tear. Such damage can cause the spin track performance to degrade, which impacts the quality of the fabrication step(s) performed by the spin track, with resulting quality degradation in chips fabricated in damaged spin tracks. Since the effects of such damage may be cumulative, rather than acute, regular maintenance can counteract such cumulative effects. In some cases, acute damage to a spin track can cause the machine to cease operation, or to be unable to perform the fabrication step(s) for which it is employed. In such cases immediate maintenance is required to restore the spin track to its operational state.

A spin track may produce diagnostic information concerning its operation including, but not limited to, the number of wafers it has processed, the highest revolutions per minute (rpm) achieved in the spin track, time to achieve a desired rpm (spin up time), time spent at various rpms (spin times), highest temperature achieved in the spin track, time to achieve a desired temperature (heat up time), time spent at various temperatures (heat time), and the number of times automatic cleaning was performed in the spin track. Conventionally, analyzing diagnostic information if performed at all, required a skilled on site operator to examine the diagnostic information or required the data to be sent (e.g. mailed, faxed) on a periodic basis to a maintenance expert. Rather than scheduling maintenance based on analyses of diagnostic information, maintenance for a sophisticated device like a spin track may have been performed, if at all, on a calendar based system (e.g. machine examined every 12 months) or on an ad hoc basis (e.g. when the machine breaks). As just in time delivery techniques have become more common, such conventional maintenance scheduling has become inadequate. Further, with the increased sophistication and resulting cost of fabrication tools like spin tracks, closer attention to maintenance is required to mitigate performance degradation problems. Thus a system and method is required to facilitate analyzing diagnostic information from spin tracks to enable scheduling routine and special maintenance.

Conventionally, generating feedback and/or feed forward (hereinafter feedback) control information for a sophisticated fabrication device like a spin track, if performed at all, has been performed at the site where the fabrication occurs. But with the increased complexities and costs involved in analyzing the fabrication process data, such feedback control may be foregone, and as a result overall fabrication quality may suffer and thus desired critical dimensions may not be achieved. With the increased requirements for smaller features and higher quality chips, a system and method is required to facilitate generating feedback control information for spin tracks.

The process of manufacturing semiconductors, or integrated circuits (commonly called ICs, or chips), typically consists of more than a hundred steps, during which hundreds of copies of an integrated circuit may be formed on a single wafer. A number of steps performed in a spin track can benefit from a properly maintained spin track. Further, a number of steps can benefit from monitoring and feedback control to ensure quality, including one or more steps performed in or by a spin track.

The requirement of small features with close spacing between adjacent features requires sophisticated manufacturing techniques, including high-resolution photolithographic processes. Fabricating a semiconductor using such sophisticated techniques may involve a series of steps including cleaning, thermal oxidation or deposition, masking, developing, etching, baking and doping. Each such step may require active monitoring and feedback. One or more such steps may be performed in or by a spin track, and thus a system and method for monitoring the maintenance status of such spin tracks is required to facilitate fabricating chips that meet desired critical dimensions.

Wafers may be pre-cleaned using, for example, high-purity, low-particle chemicals. One or more cleaning steps may be performed in a spin track. The silicon wafers may be heated and exposed to ultra-pure oxygen in diffusion furnaces under carefully controlled conditions to form a silicon dioxide film of uniform thickness on the surface of the wafer. Once clean, layers of oxide and photo resist are deposited on the wafer. The layers may be deposited in or by a spin track. To facilitate achieving desired critical dimensions, the oxide should be applied in a uniform manner resulting in a layer with a substantially planar surface. The oxide may be applied in a spin track. To facilitate desired oxide application, a properly function, well-maintained spin track is important. Thus, a system and method for monitoring diagnostic data, for feeding back control information and for scheduling routine and special maintenance is required.

The masking step is used to protect one area of the wafer while working on another area. This process is referred to as photolithography or photo-masking. A photo resist, or light-sensitive film, is applied to the wafer, giving it characteristics similar to a piece of photographic paper. To facilitate achieving desired critical dimensions, the photo resist should be applied in a uniform manner resulting in a layer with a substantially planar surface. The photo resist is typically applied in a spin track. To facilitate desired photo resist application, a properly functioning, well-maintained spin track is important. Thus, a system for monitoring diagnostic data, for feeding back control information, and for scheduling routine and special maintenance on a spin track is required.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system that facilitates monitoring diagnostic information associated with a spin track to schedule routine and special maintenance, and, in an alternative aspect, for generating feedback and/or feed forward (hereinafter feedback) control information to control semiconductor fabrication in a spin track. An exemplary system may employ a spin track, one or more analysis systems associated with the spin track, wherein the spin track generates diagnostic data and sends such diagnostic data to the analysis system(s) for analysis, and one or more maintenance system(s) for scheduling routine and special maintenance of the spin track based, at least in part, on analysis data generated by the analysis system(s). An exemplary analysis system may compare the diagnostic data received from one or more spin tracks with desired diagnostic data and/or maintenance schedules to determine how the spin track is operating. An alternative aspect of an exemplary analysis system may employ techniques including, but not limited to, numerical analysis, pattern matching, linear regression, neural networks, object-oriented programming and structured programming to analyze diagnostic data. An exemplary maintenance system may determine, based at least in part on the results of the analysis system(s), that routine and/or special maintenance is required and schedule such maintenance.

An alternative aspect of the present invention may also generate feedback control information to cause the spin track to adapt the fabrication process underway. The feedback control information may be generated, at least in part, based on the results of the analysis system(s).

Analysis systems, maintenance systems, feedback control information systems and spin tracks can be arranged and thus interact in a variety of ways. For example, the analysis system(s) and/or the maintenance system(s) and/or the feedback control information system(s) may be located locally and/or remotely from the spin track. Further, one or more analysis systems may analyze the diagnostic information provided by one or more spin tracks. Similarly, one or more maintenance systems may determine whether to schedule maintenance based on analysis results from one or more analysis systems and/or from diagnostic information from one or more spin tracks. Similarly, one or more control information systems may generate control feedback and/or feed forward information based on analyses from one or more analysis systems, and/or from diagnostic data from one or more spin tracks.

Enabling remote monitoring and analysis of spin track diagnostic information by one or more analysis systems may produce improved diagnoses by enabling, for example, analysis of larger data samples, compilation of more comprehensive diagnostic data patterns, comparison of problems between a larger number of spin tracks, analysis of spin track data by more experienced, better trained personnel, and analysis of spin track data by more sophisticated, more powerful automated means. Enabling cooperative and/or centralized analysis of spin track data may improve maintenance by, for example, enabling automated processes to examine the diagnostic data and to automatically schedule maintenance producing more timely and appropriate maintenance and by informing the maintenance personnel of tools and/or parts they may need to take with them to perform the required maintenance on the spin track. Enabling automated monitoring and analysis of spin track diagnostic information may prevent costly crashes of spin track apparatus by, for example, facilitating notifying a spin track operator to shut down a spin track because that spin track is experiencing a degradation of performance that may be indicating an impending crash. By way of further illustration, centrally collecting spin track diagnostic information from many spin tracks may enable actions like recalls if a certain problem is identified for a certain class of spin tracks.

In accordance with an aspect of the present invention, a system for remotely analyzing diagnostic information is provided, comprising: one or more analysis systems for analyzing diagnostic information from one or more spin tracks, the one or more analysis systems comprising one or more analysis components; and one or more maintenance systems for scheduling maintenance for one or more spin tracks, based at least in part on diagnostic information from the one or more spin tracks, the one or more maintenance systems comprising one or more maintenance components.

Another aspect of the present invention provides a system for remotely analyzing diagnostic information comprising: one or more analysis systems for analyzing diagnostic information from one or more spin tracks, the one or more analysis systems comprising one or more analysis components; one or more maintenance systems for scheduling maintenance for one or more spin tracks, based at least in part on diagnostic information from the one or more spin tracks, the one or more maintenance systems comprising one or more maintenance components and one or more control information systems for generating feedback control information to adapt one or more processing steps performed by the one or more spin tracks, wherein the feedback control information is based at least in part on data generated by the one or more analysis systems components, the control information system comprising one or more control information components.

Another aspect of the present invention provides a computer readable medium having computer executable components, comprising: one or more analysis systems for analyzing diagnostic information associated with one or more spin tracks; and one or more maintenance systems for scheduling routine and special maintenance for the one or more spin tracks.

Yet another aspect of the present invention provides a data packet adapted to be transmitted from a first computer process to a second computer process, comprising: information related to diagnostic information collected from one or more spin tracks, information related to analysis performed on diagnostic information collected from one or more spin tracks and information related to feedback control information for controlling one or more fabrication steps in one or more spin tracks.

Still yet another aspect of the present invention provides a computer readable medium having stored thereon a data structure, comprising: a first data field containing first data related to diagnostic information collected from one or more spin tracks; a second data field containing second data derived from the first data field, wherein the second data relates to maintenance scheduled to be performed on the one or more spin tracks, and a third data field containing third data derived from the first data field, wherein the third data relates to feedback control information related to the analysis of the first data field.

Another aspect of the present invention provides a method for remotely analyzing diagnostic information comprising: collecting diagnostic information from one or more spin tracks; transmitting the diagnostic information to an analyzer via data communication means; analyzing the diagnostic information to produce analysis data related to the maintenance status of the one or more spin tracks; and producing maintenance schedule data for the one or more spin tracks.

Yet another aspect of the present invention provides a method for remotely analyzing diagnostic information comprising: means for collecting diagnostic information from one or more spin tracks; means for transmitting the diagnostic information to an analyzer via data communication means; means for analyzing the diagnostic information to produce analysis data related to the maintenance status of the one or more spin tracks; and means for producing maintenance schedule data for the one or more spin tracks.

To the accomplishment of the foregoing and related ends, the invention, then, comprises the features hereinafter fully described and particularly pointed out in the claims. The following description and the annexed drawings set forth in detail certain illustrative aspects of the invention. These aspects are indicative of but a few of the various ways in which the principles of the invention may be employed. Other objects, advantages and novel features of the invention will become apparent from the following detailed description of the invention when considered in conjunction with the drawings.

DETAILED DESCRIPTION

The present invention will now be described with reference to the drawings, wherein like reference numerals are used to refer to like elements throughout. The present invention will be described with reference to a system for analyzing diagnostic information from one or more spin tracks and producing maintenance schedule information concerning the one or more spin tracks. An alternative aspect of the present invention will be described with reference to a system for generating feedback and/or feed forward (hereinafter feedback) control information to control one or more fabrication processes carried out by the one or more spin tracks. The following detailed description is of the best modes presently contemplated by the inventors for practicing the invention. It should be understood that the description of these aspects are merely illustrative and that they should not be taken in a limiting sense.

Figure 1:
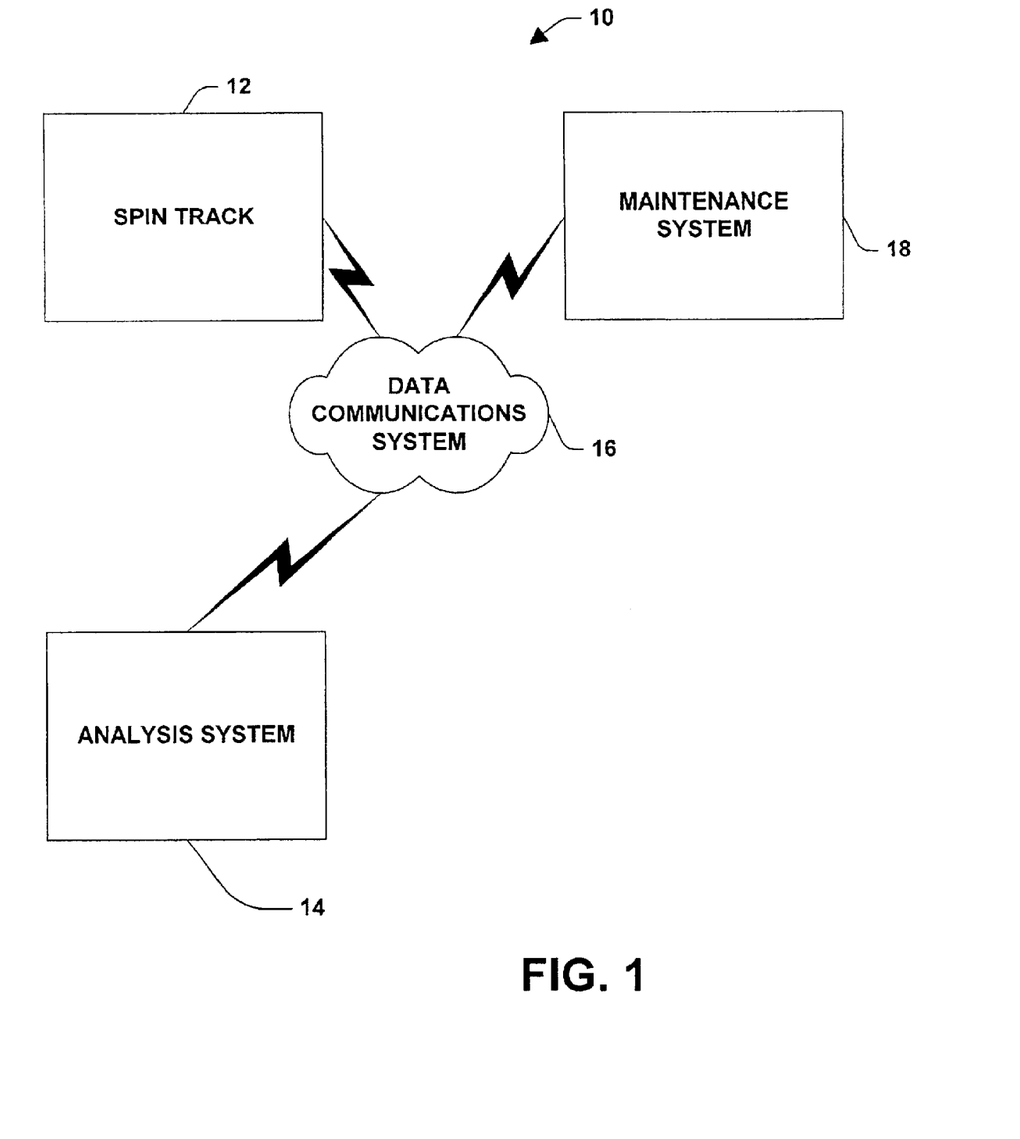
FIG. 1 is schematic block diagram of a system for remotely analyzing diagnostic information collected from a spin track and for scheduling maintenance for the spin track in accordance with an aspect of the present invention.

Referring initially to FIG. 1, a system 10 for remotely analyzing diagnostic information collected from a spin track 12 is illustrated. The spin track 12 is operatively connected to an analysis system 14 via a data communication system 16, (e.g. the Internet), which enables transferring data from the spin track 12 to the analysis system 14. The analysis system 14 may be located in the same physical location as the spin track 12 and/or may be located in a different physical location than the spin track 12. The analysis system 14 may include one or more components, some of which may be located locally to the spin track 12 and some of which may be located remotely from the spin track 12. The analysis system 14 can collect data from a plurality of spin tracks 12. Thus, centralized monitoring of spin track diagnostic information is facilitated with resulting improved quality control by, for example, facilitating numerical analysis on larger data samples, facilitating recognition of diagnostic data anomalies from a larger population of spin tracks and/or by facilitating automated analysis by more powerful analysis machines.

The analysis system 14 analyses the diagnostic information received from the spin track 12 via any suitable analysis method, including, but not limited to, pattern matching, table lookups, neural networks, linear regression, object-oriented techniques and structured programming techniques. It is to be appreciated by one skilled in the art that any suitable analysis method may be employed in the present invention.

The analysis system 14 is operatively connected to the data communication system 16 to enable transmitting analysis information to a maintenance system 18. The maintenance system 18 can generate scheduling information based at least in part on results form the analysis performed by the analysis system 14. For example, the maintenance system 18 may determine that routine maintenance is required for one or more first spin tracks, and may further determine that special (e.g. emergency) maintenance is required for one or more second spin tracks. Thus, mitigating maintenance scheduling problems is facilitated by automated remote maintenance scheduling for spin tracks.

It is to be appreciated by one skilled in the art that although one spin track 12 is illustrated, that one or more spin tracks 12 may transmit data to one or more analysis systems 14 and/or one or more maintenance systems 18. It is to be further appreciated that although the analysis system 14 is illustrated as one entity, that the analysis system 14 can include one or more components that can be located together or distributed. The analysis system 14 components can be located locally to one or more spin tracks 12 and/or can be located remotely from one or more spin tracks 12. It is to be further appreciated that although the maintenance system 18 is illustrated as one entity, that the maintenance system 18 can include one or more components that can be located together or distributed. The maintenance system 18 components can be located locally to one or more spin tracks 12 and/or can be located remotely from one or more spin tracks 12. Further, the maintenance system 18 components can be located locally to one or more analysis system 14 components and/or can be located remotely from one or more analysis system 14 components.

By way of illustration, diagnostic information concerning the temperature of a hot plate in the spin track 12 can be collected. A desired temperature range for the hot plate may be required for operation of the spin track 12. If a desired temperature range cannot be achieved and/or maintained, wafer quality may be negatively impacted. Diagnostic information concerning the temperature range within which the hot plate can be maintained, time to achieve the desired temperature range, and the time spent at the desired temperature range may be collected. The hot plate diagnostic information can be employed to schedule routine and/or special maintenance on the spin track 12. Further, the diagnostic information may indicate that the spin track 12 is incapable of achieving and/or maintaining a desired temperature on the hot plate. Thus, feedback information may be generated to adapt the wafer fabrication process. For example, if the hot plate can achieve a first desired temperature, but can achieve a second, lower temperature, then the processing time may be lengthened based, at least in part, on that lower achievable, maintainable temperature. But if the hot plate cannot maintain a temperature within a desired temperature range, then feedback information may be generated to shut down the spin track 12 until such time as maintenance can be performed on the spin track 12.

By way of further illustration, diagnostic information concerning the humidity and/or temperature inside a spin track 12 developer enclosure can be generated. The humidity and/or temperature inside a spin track 12 developer enclosure can be important to wafer processing. For example, if a desired temperature and/or humidity cannot be achieved and/or maintained, then wafer quality may be negatively impacted. Thus, feedback information concerning the humidity and/or temperature inside a spin track 12 developer enclosure can be generated. For example, if a first temperature can not be achieved, but a second lower temperature can be achieved, then feedback information may be generated to adapt the spin track 12 fabrication process to lengthen processing time. Further, if a first humidity can not be achieved, but a second higher humidity can be achieved, then feedback information may be generated to adapt the spin track 12 fabrication process to include more humidity lowering steps.

By way of further illustration, diagnostic information concerning the amine content of air that enters the spin track 12 can be generated. In one example spin track 12 processing environment it is important to minimize the amine content of air entering the spin track 12. Thus, diagnostic information may be generated concerning the minimal and average levels of amines in the air entering the system, for example. The diagnostic information may be employed to schedule routine and/or special maintenance on filters, for example, employed in filtering amines from air entering the spin track 12. Further, feedback information may be generated to adapt the spin track 12 fabrication process. For example, if the spin track 12 air filtering system is leaving a first amount of amines in the incoming air, then the manufacturing process may be adapted by increasing the number of times that incoming air is passed through a filtering system, for example.

By way of further illustration, diagnostic information may be collected concerning the thickness of thin film layers produced in the spin track 12. Thin film layer thickness can be important to properties including, but not limited to, conductivity between components and/or layers, insulation between components and/or layers, layer isolation, and voids, which can affect, for example, achieving desired packing densities on chips. Thus diagnostic information concerning the thickness of thin layers being produced in a spin track 12 can be generated. Such diagnostic information can be employed to schedule routine and/or emergency maintenance. Such diagnostic information can also be employed to generate feedback information that can be employed to adapt the spin track 12 manufacturing process. For example, if the diagnostic information indicates that the thin film layer thickness is too thin, then additional thin film deposition processing may be performed, based at least in part, on the feedback information generated, at least in part, from the diagnostic information.

By way of further illustration, diagnostic information may be collected concerning the planarity (smoothness) of the surfaces produced during spin track 12 manufacturing processes. The smoothness can be important to properties including, but not limited to, insulation between layers and/or components, conductivity between layers and/or components, isolation between components, and voids, for example. Thus, diagnostic information concerning how smooth a surface is produced during spin track 12 manufacturing processes can be collected. Such diagnostic information can be employed to schedule routine and/or emergency maintenance. Such diagnostic information can also be analyzed to produce feedback control information, which can be employed to adapt the spin track 12 manufacturing process. For example, if diagnostic measurements indicate that a desired smoothness level is not being achieved in the spin track 12, then additional processing time may be allocated to processing steps concerned with surface smoothness (e.g. heating and reheating of a deposited layer).

Although five types of diagnostic information are described above, it is to be appreciated by one skilled in the art that a greater or lesser number of types of diagnostic may be employed in accordance with the present invention. It is to be further appreciated that diagnostic information concerning other properties including, but not limited to optical properties, refraction indices, grating structures, defect control, line width control, may be employed in accordance with the present invention.

Figure 2:
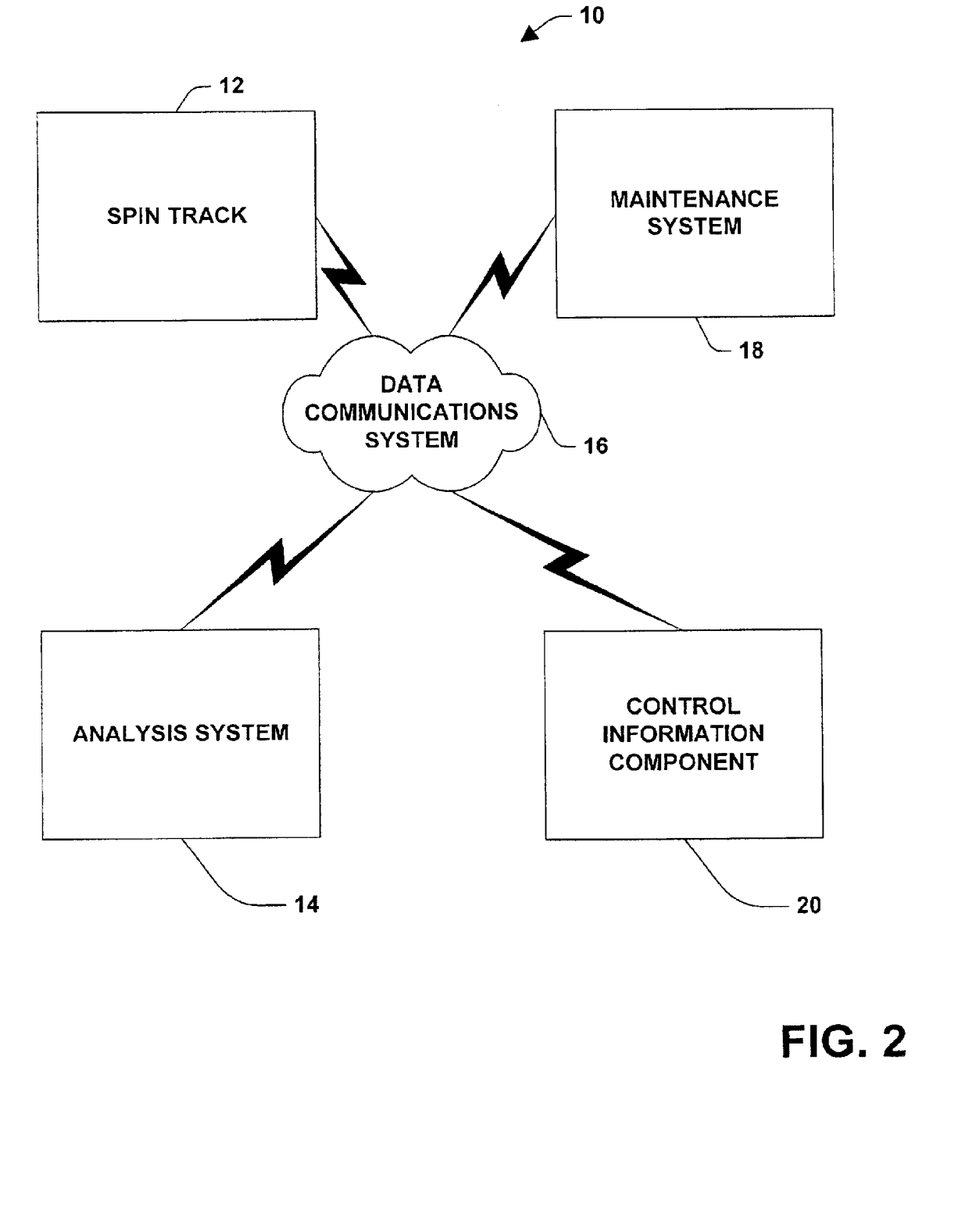
FIG. 2 is a schematic block diagram of a system for remotely analyzing diagnostic information collected from a spin track, for scheduling maintenance for the spin track and for feeding back control information to the spin track in accordance with an aspect of the present invention.

Turning now to FIG. 2, the system 10 for remotely analyzing diagnostic information collected from a spin track 12 is illustrated as further including a control information system 20. The spin track 12, the analysis system 14 and/or the maintenance system 18 are operatively connected via the data communication system 16 to the control information system 20. The control information system 20 can generate feedback control information operative to cause the spin track 12 to adapt fabrication steps currently underway in the spin track. For example, the control information system 20 can generate feedback control information to slow down the fabrication step for a portion of the wafer being fabricated in the spin track 12 by lowering the temperature in the spin track.

It is to be appreciated by one skilled in the art that although one data communications system 16 is illustrated, that a greater number of data communication systems 16 may be employed between the spin track 12, the analysis system 14, the maintenance system 18 and the control information system 20. It is to be further appreciated that any suitable data communication system 16, including, but not limited to the Internet, local area networks, wide area networks, dial up systems, and/or client/sever systems can be employed with the present invention. Further, connections to the data communications system 16 may be permanent or temporary, dedicated or employed on an ad hoc as necessary basis.

It is to be appreciated by one skilled in the art that although the control information system 20 is illustrated as a single component, that a greater number of components can be employed in the control information system 20. It is to be further appreciated that the control information 20 components can be located together or be distributed, and that the control information system 20 components can be located locally to one or more spin tracks 12, one or more analysis system 14 components and/or one or more maintenance system 18 components.

Figure 3:
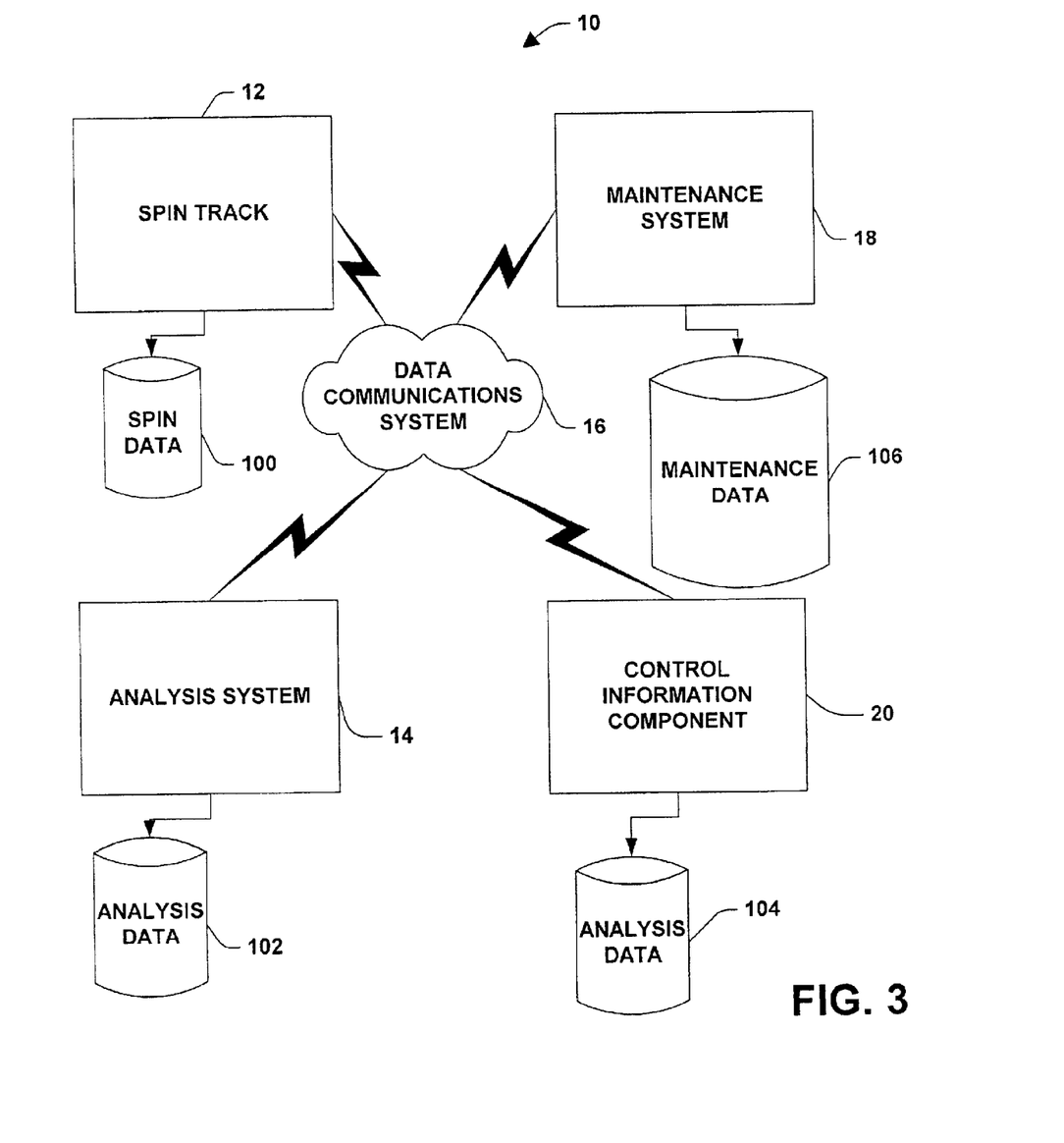
FIG. 3 is a schematic block diagram of a system for remotely analyzing diagnostic information collected from a spin track, for scheduling maintenance for the spin track and for feeding back control information to the spin track wherein the components employed in the system retain local copies of data accordance with an aspect of the present invention.

Turning now to FIG. 3, the system 10 is illustrated further including local data storage for the spin track 12, the analysis system 14, the maintenance system 18 and the control information system 20. The spin track 12 can store spin data in a spin data store 100. It is to be appreciated by one skilled in the art that the data store 100 may be any suitable data storage means including, but not limited to, a database, a file, a spreadsheet, a text document, an HTML document, and/or an XML document. Further, although the data store 100 is illustrated local to the spin track 12, the data can be stored locally or remotely to the spin track 12, and the data may be distributed between one or more data stores.

The analysis system 14 can similarly store analysis data in an analysis data store 102. It is to be appreciated by one skilled in the art that the data store 102 can be any suitable data storage means including, but not limited to, a database, a file, a spreadsheet, a text document, an HTML document, and/or an XML document. Further, although the data store 102 is illustrated local to the analysis system 14, the data can be stored locally or remotely to the analysis system 14, and the data may be distributed between one or more data stores.

The maintenance system 18 can store maintenance data in a maintenance data store 104. It is to be appreciated by one skilled in the art that the data store 104 can be any suitable data storage means including, but not limited to, a database, a file, a spreadsheet, a text document, an HTML document, and/or an XML document. Further, although the data store 104 is illustrated local to the maintenance system 18, the data may be stored locally or remotely to the maintenance system 18, and the data may be distributed between one or more data stores.

The control system 20 can store control data in a control data store 106. It is to be appreciated by one skilled in the art that the data store 106 can be any suitable data storage means including, but not limited to, a database, a file, a spreadsheet, a text document, an HTML document, and/or an XML document. Further, although the data store 106 is illustrated local to the control system 20, the data may be stored locally or remotely to the control system 20, and the data can be distributed between one or more data stores.

It is to be further appreciated by one skilled in the art that although the data stores 100, 102, 104 and 106 are illustrated receiving data directly from their corresponding data generators, that data may flow to and/or from the data stores 100, 102, 104 and 106 via data communication means, for example, the Internet.

Figure 4:
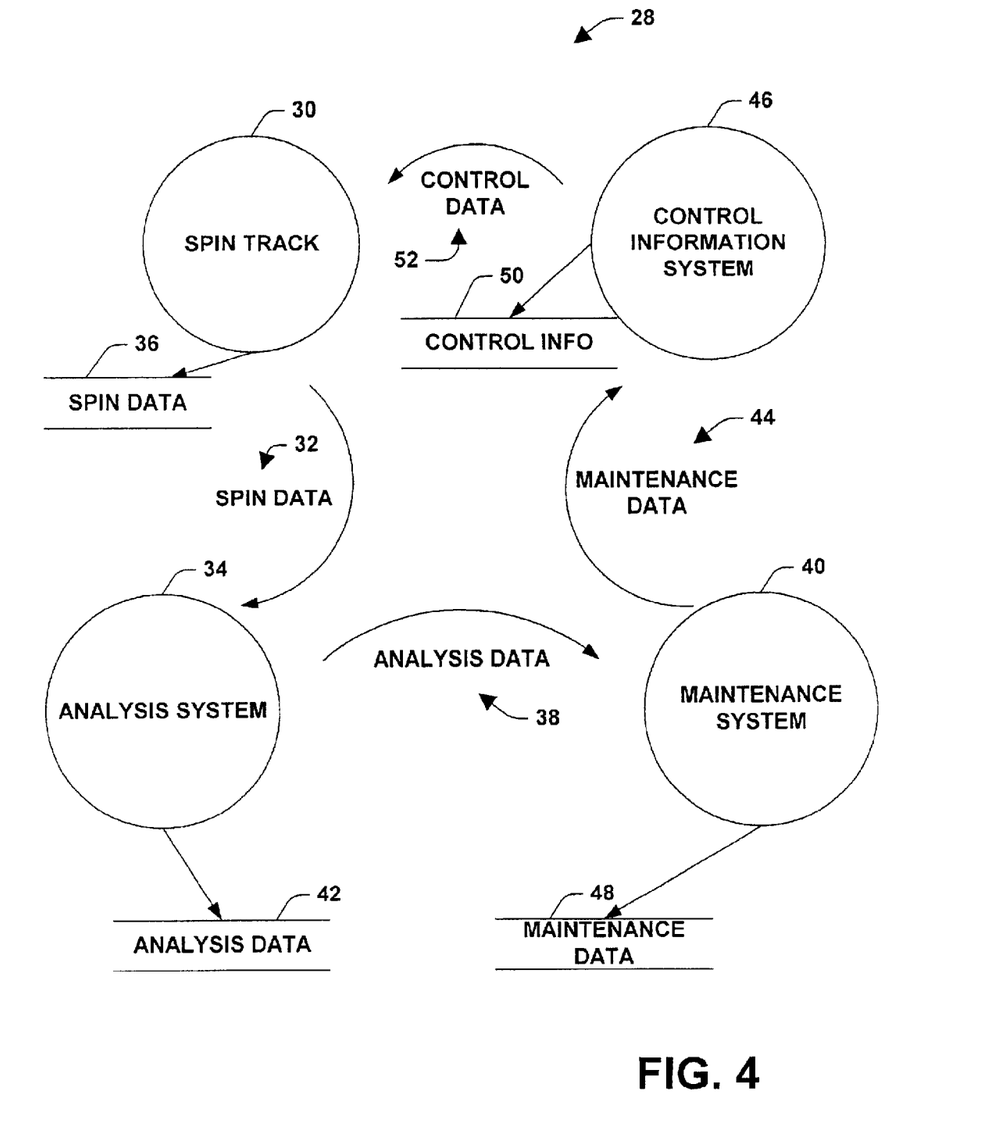
FIG. 4 is a data flow diagram illustrating the flow of data in a system for remotely analyzing diagnostic information collected from a spin track, for scheduling maintenance for the spin track and for feeding back control information to the spin track in accordance with an aspect of the present invention.

Turning now to FIG. 4, a data flow diagram for the system 10 is illustrated. A spin track process 30 generates spin data 32 that is sent to an analysis system 34. The spin data 32 can consist of diagnostic information generated by the spin track process 30. For example, diagnostic information including, but not limited to the number of wafers processed, the highest revolutions per minute (rpm) achieved in the spin track, time to achieve a desired rpm, time spent at various rpms, highest temperature achieved in the spin track, time to achieve a desired temperature, time spent at various temperatures, and the number of times automatic cleaning was performed in the spin track may be collected. Analyzing the spin data 32 to determine required maintenance can be important to maintaining the spin track process 30 at a desired level to facilitate achieving desired critical dimensions. The spin track process 30 can also store the spin data 32 in a spin data store 36 to enable additional processing including, but not limited to, retransmission, historical logging, quality assurance processing and data modeling.

The analysis system process 34 generates analysis data 38 that is sent to a maintenance system 40. Sending the analysis data 38 to the maintenance system 40 enables centralized processing of the analysis data 38 and thus facilitates improving scheduling quality control by, for example, enabling analysis of larger data samples, compilation of more comprehensive diagnostic data patterns, comparison of problems between a larger number of spin tracks, analysis of spin track data 32 by more experienced, better trained personnel, and analysis of spin track data 32 by more sophisticated, more powerful automated means. Enabling cooperative and/or centralized analysis of spin track data 32 may improve maintenance by, for example, enabling automated processes to examine the diagnostic data and to automatically schedule maintenance producing more timely and appropriate maintenance and by informing the maintenance personnel of tools and/or parts they may be employed to perform required maintenance on the spin track. Enabling automated monitoring and analysis of spin track data 32 can prevent costly crashes of spin track apparatus by, for example, enabling notifying a spin track process 30 operator to shut down a spin track process 30 because that spin track process 30 is experiencing a degradation of performance indicating an impending crash. By way of further illustration, centrally collecting spin track data 32 from many spin track processes 30 may enable actions like recalls, if a certain problem is identified for a certain class of spin tracks.

By way of still further illustration, collecting spin track data 32 from a plurality of spin track processes 30 facilitates identifying maintenance trends and/or exceptions, thus improving spin track process 30 performance and enhancing spin track 30 lifetime. Further, sending the spin data 32 to the analysis system 34 enables a spin process 30 that does not have diagnostic information analysis capability at the fabrication location to benefit from the existence and availability of the analysis system 34, thus facilitating maintaining the spin process 30.

The analysis data 38 may also be stored in an analysis data store 42 to enable additional processing including, but not limited to, retransmission, historical logging, quality assurance processing and data modeling.

The maintenance system 40 analyzes the analysis data 38 to determine whether regular and/or special (e.g. emergency) maintenance is required. A plurality of spin track processes 30 may share a maintenance system 40 and thus the resources dedicated to the maintenance system 40 can be increased because the cost of the maintenance system 40 can be spread over a larger number of spin processes 30, reducing the cost to each spin process 30. Such reduced costs encourage active monitoring of the spin track process 30, and thus facilitate improving spin track performance and enhancing spin track lifetime.

The maintenance system 40 produces maintenance data 44 that is sent to a control information system 46, wherein control data 52 is generated. The control information system 46 can process maintenance data 44 from a plurality of maintenance systems 40 and thus the resources dedicated to the control information system 46 can be increased, since the cost of the control information system 46 can be shared between the plurality of maintenance systems 40, analysis systems 34 and/or spin processes 30. Such cost sharing enables creating more powerful fabrication control information systems 42 that may then be shared by the plurality of spin processes 30.

The maintenance data 44 may also be stored in a maintenance data store 48 to enable additional processing including, but not limited to, retransmission, historical logging, quality assurance processing and data modeling. The control data 52 can be sent to the spin process 30 to adapt fabrication steps being performed by the spin process 30. Feeding back the control data 52 can improve the quality of the spin process 30 by enabling correcting fabrication defects during fabrication. For example, in the post exposure bake (PEB) step, a wafer may be baking and hardening at an undesired rate. Diagnostic information in the spin data 32 may indicate that the highest desired PEB temperature is not attainable by the spin process 30 and/or that the time to reach a desired temperature is too long, thus requiring an adaptation to the spin process 30. Feedback control information can enable controlling the PEB temperature, thus improving chip quality. The control data 52 can also be stored in a control data store 50 to enable additional processing including, but not limited to, retransmission, historical logging, quality assurance processing and data modeling.

Figure 5:
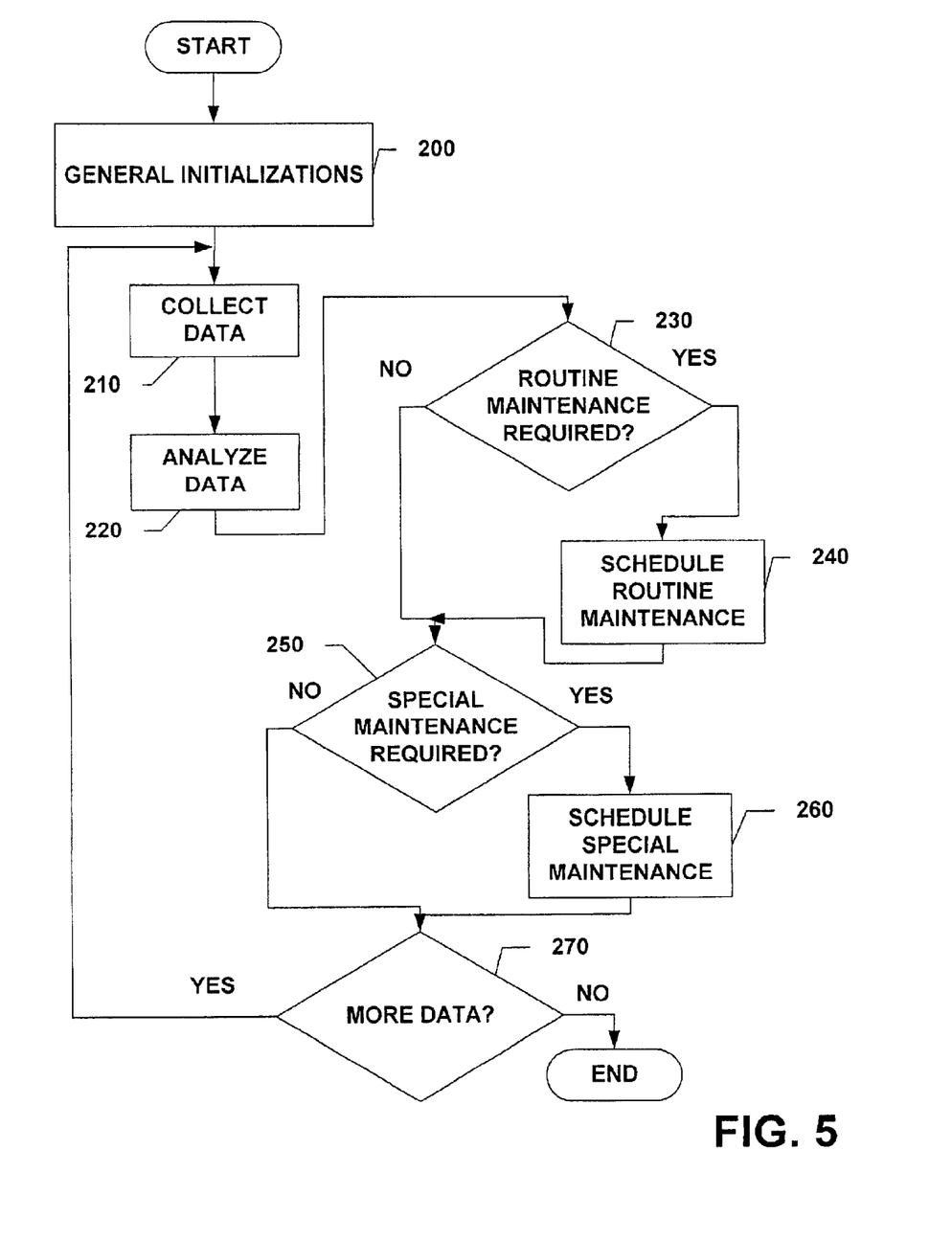
FIG. 5 is a flow diagram illustrating one specific methodology for carrying out the present invention.
Figure 6:
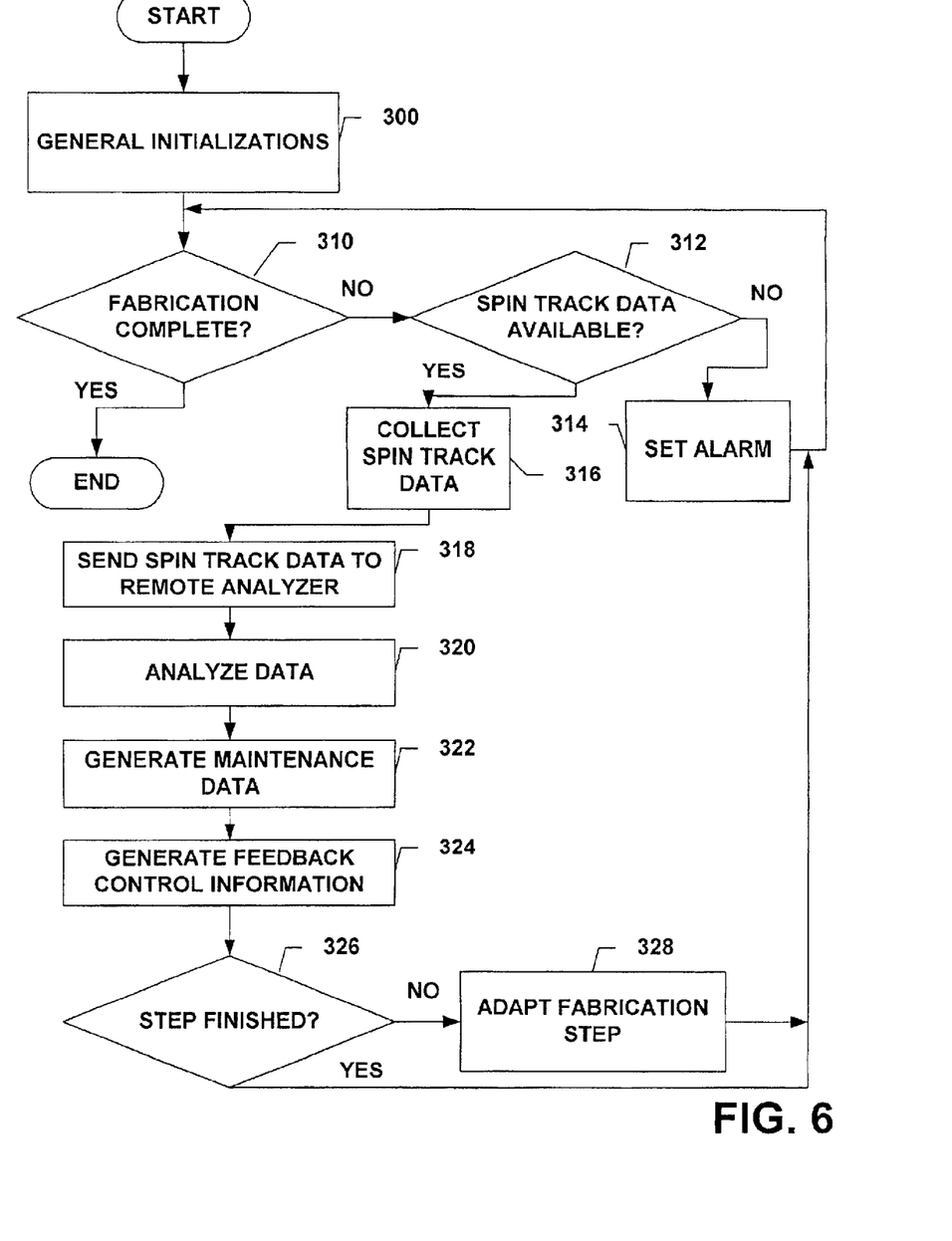
FIG. 6 is a flow diagram illustrating another specific methodology for carrying out the present invention.

In view of the exemplary systems shown and described above, a methodology, which may be implemented in accordance with the present invention, will be better appreciated with reference to the flow diagrams of FIGS. 5 and 6. While, for purposes of simplicity of explanation, the methodologies of FIG. 5 and FIG. 6 are shown and described as a series of steps, it is to be understood and appreciated that the present invention is not limited by the order of the steps, as some steps may, in accordance with the present invention, occur in different orders and/or concurrently with other steps from that shown and described herein. Moreover, not all illustrated steps may be required to implement a methodology in accordance with the present invention.

Referring now to FIG. 5, a method for practicing the present invention is flow-charted. At step 200, general initializations are made to a system for remotely analyzing diagnostic information from a spin track. The initializations may include, but are not limited to, establishing data communications, determining the type or types of spin tracks generating diagnostic information and setup up data stores for retrieving diagnostic information data for comparison and analysis to diagnostic information to be collected. At step 210, diagnostic information is collected. The diagnostic information can include, but is not limited to, the number of wafers processed, the highest revolutions per minute (rpm) achieved in the spin track, time to achieve a desired rpm, time spent at various rpms, highest temperature achieved in the spin track, time to achieve a desired temperature, time spent at various temperatures, and the number of times automatic cleaning was performed in the spin track. It is to be appreciated by one skilled in the art that the data collected can be collected byte by byte, field by field, record by record, file by file, and/or by any other suitable data collection method. At step 220, the data collected at step 210 is analyzed. The data can be analyzed using methods including, but not limited to, numerical analysis, pattern matching, linear regression, neural networks, object-oriented programming and structured programming.

At step 230, a determination is made concerning whether routine maintenance is required. For example, based on how many wafers the spin track has processed, routine examination and/or replacement of one or more components of the spin track may be scheduled. If at step 230, the determination is YES, that routine maintenance is required, then at step 240 routine maintenance can be scheduled. For example, an email can be sent to maintenance personnel indicating that maintenance should be performed and/or a database of maintenance to be performed may be updated. It is to be appreciated by one skilled in the art that any suitable maintenance scheduling and notification method can be employed in the present invention.

At step 250 a determination is made concerning whether special (e.g. maintenance, recall) maintenance is required. For example, based on the inability of the spin track to achieve a desired rpm, an immediate examination and/or replacement of one or more components of the spin track can be scheduled. If at step 250, the determination is YES, that special maintenance is required, then at step 260 such special maintenance can be scheduled. For example, maintenance personnel may be paged as a notification that maintenance should be performed. Alternatively, a database of maintenance to be performed may be updated, causing emergency repair processes to identify the emergency condition and undertake notification procedures. It is to be appreciated by one skilled in the art that any suitable scheduling and maintenance notification may be employed in the present invention.

At step 270 a determination is made concerning whether more data has arrived and/or is likely to arrive. If the determination at step 270 is YES, then process control returns to step 210. If the determination at step 270 is NO, then the iteration of the method concludes.

Turning now to FIG. 6, an alternative method for processing spin track diagnostic information is illustrated. At step 300, general initializations are made to a system for remotely analyzing diagnostic information from a spin track. The initializations may include, but are not limited to, establishing data communications, determining the type or types of spin tracks generating diagnostic information and setting up data stores for holding diagnostic information data for comparison and analysis to diagnostic information to be collected.

At step 310, a determination is made concerning whether the fabrication process generating diagnostic information has completed. If the determination at step 310 is NO, then at step 312 a determination is made concerning whether diagnostic information is available from the fabrication process. If the determination at step 312 is NO, then at step 314 an alarm can be set indicating that diagnostic information is not available. Such an alarm may be employed by other processes and or apparatus to mark the spin track for further examination and/or maintenance. If the determination at step 312 is YES, then at step 316 diagnostic information can be collected. The diagnostic information can include, but is not limited to, the number of wafers processed, the highest revolutions per minute (rpm) achieved in the spin track, time to achieve a desired rpm, time spent at various rpms, highest temperature achieved in the spin track, time to achieve a desired temperature, time spent at various temperatures, and the number of times automatic cleaning was performed in the spin track. It is to be appreciated by one skilled in the art that the data collected can be collected byte by byte, field by field, record by record, file by file, and/or by any other suitable data collection method.

At step 318 the diagnostic information collected at step 316 is transmitted to a remote analyzer. At step 320, the data transmitted at step 318 is analyzed. The data can be analyzed using methods including, but not limited to, numerical analysis, pattern matching, linear regression, neural networks, object-oriented programming and structured programming. At step 322, maintenance data can be generated, based at least in part on the spin track data analyzed in step 320. The maintenance data can be employed to schedule regular and/or special maintenance. At step 324, feedback control information can be generated. The feedback control information may be employed to control the fabrication processes underway at the spin track. For example, diagnostic information may indicate that a desired rpm may not be achieved by the spin track, and thus the feedback control information may contain information operable to adapt the fabrication process to run longer at the lower rpm. At step 326, a determination is made concerning whether the fabrication step has completed. If the determination at step 326 is NO, then at step 328, the control information generated at step 324 is sent to the spin track to adapt the fabrication step. If the determination at step 326 is YES, then control returns to step 310.

Figure 7:
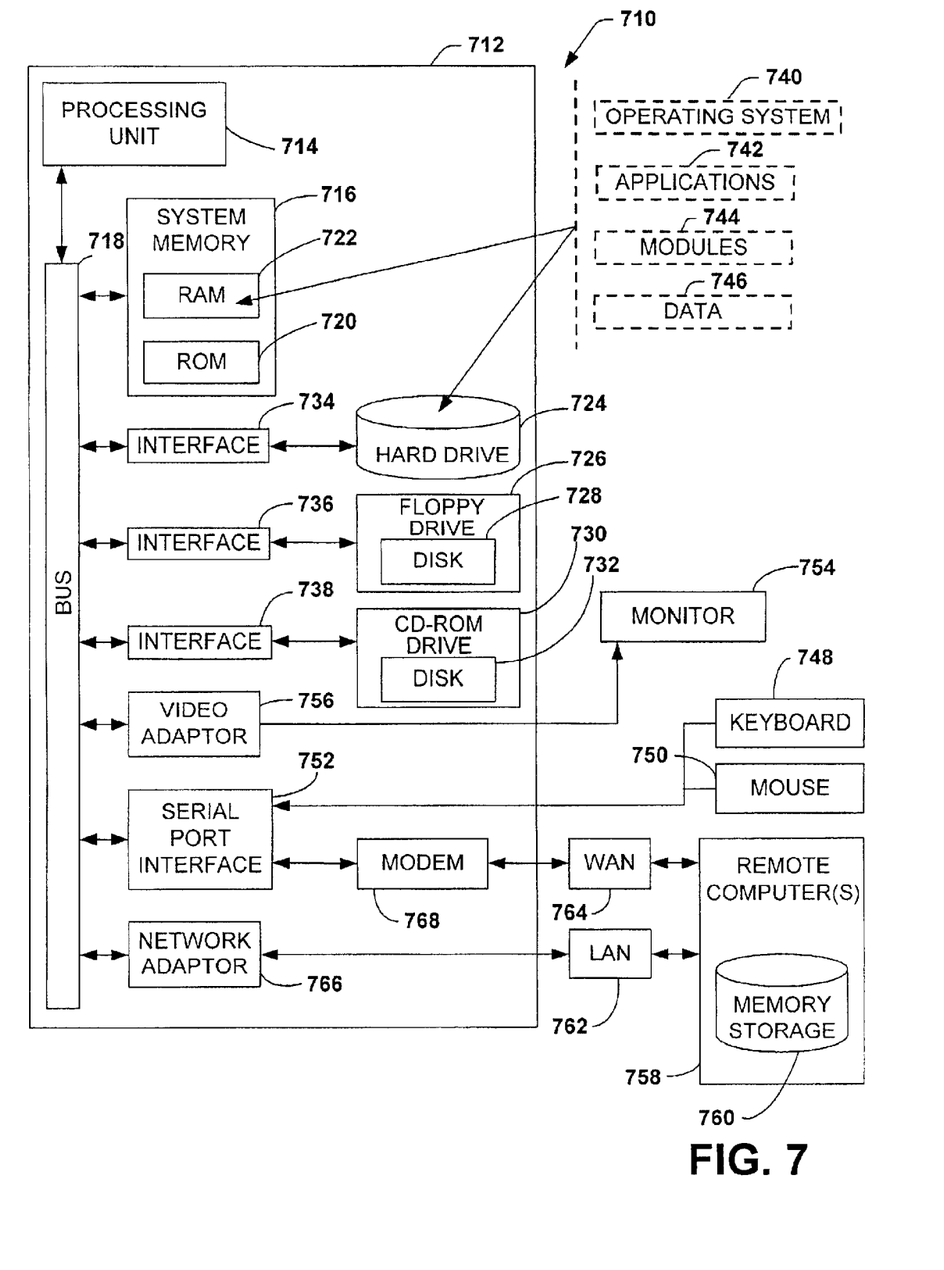
FIG. 7 is a block diagram of an exemplary operating environment for a system configured in accordance with the present invention.

In order to provide additional context for various aspects of the present invention, FIG. 7 and the following discussion are intended to provide a brief, general description of a suitable computing environment 710 in which the various aspects of the present invention can be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 7, an exemplary environment 710 for implementing various aspects of the invention includes a computer 712, including a processing unit 714, a system memory 716, and a system bus 718 that couples various system components including the system memory to the processing unit 714. The processing unit 714 may be any of various commercially available processors. Dual microprocessors and other multi-processor architectures also can be used as the processing unit 714.

The system bus 718 can be any of several types of bus structure including a memory bus or memory controller, a peripheral bus, and a local bus using any of a variety of conventional bus architectures such as PCI, VESA, Microchannel, ISA, and EISA, to name a few. The system memory 716 includes read only memory (ROM) 720 and random access memory (RAM) 722. A basic input/output system (BIOS), containing the basic routines that help to transfer information between elements within the computer 712, such as during startup, is stored in ROM 720.

The computer 712 further includes a hard disk drive 724, a magnetic disk drive 726 to read from or write to, for example, a removable disk 728, and an optical disk drive 730 for reading, for example, from a CD-ROM disk 732 or to read from or write to other optical media. The hard disk drive 724, magnetic disk drive 726, and optical disk drive 730 are connected to the system bus 718 by a hard disk drive interface 734, a magnetic disk drive interface 736, and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 722, including an operating system 740, one or more application programs 742, other program modules 744, and program data 746. The operating system 740 in the illustrated computer is, for example, the "Microsoft® Windows® NT" operating system, although it is to be appreciated that the present invention may be implemented with other operating systems or combinations of operating systems, such as UNIX®, LINUX®, etc.

A user may enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754 or other type of display device is also connected to the system bus 718 via an interface, such as a video adapter 756. In addition to the monitor, a computer typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance (e.g., a WEBTV® client system), a peer device or other common network node, and typically includes many or all of the elements described relative to the computer 712, although, for purposes of brevity, only a memory storage device 760 is illustrated. The logical connections depicted include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, is connected to the system bus 718 via the serial port interface 752 to enable communications, for example, via POTS. The modem 768 may also, in an alternative embodiment, be connected to the network adaptor 766 to enable communications, for example, via DSL or cable. In a networked environment, program modules depicted relative to the computer 712, or portions thereof, will be stored in the remote memory storage device 760. It may be appreciated that the network connections shown are exemplary and other means of establishing a communications link between the computers may be used.

Described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for remotely analyzing diagnostic information, comprising:
    one or more analysis systems for analyzing diagnostic information from one or more spin tracks, the one or more analysis systems comprising one or more analysis components; and
    one or more maintenance systems for scheduling maintenance for one or more spin tracks, based at least in part on diagnostic information from the one or more spin tracks, the one or more maintenance systems comprising one or more maintenance components.

2. The system of claim 1, further comprising:
    one or more control information systems for generating feedback and/or feed forward control information to adapt one or more processing steps performed by the one or more spin tracks, wherein the feedback control information is based at least in part on data generated by the one or more analysis systems;
    the control information system comprising one or more control information components.

3. The system of claim 1, wherein the one or more spin tracks, the one or more analysis systems, and the one or more maintenance systems are connected by one or more data communications systems.

4. The system of claim 2, wherein the one or more spin tracks, the one or more analysis systems, the one or more maintenance systems and the one or more feedback control information systems are connected by one or more data communications systems.

5. The system of claim 3, wherein one of the one or more data communications systems is the Internet.

6. The system of claim 4, wherein one of the one or more data communications systems is the Internet.

7. The system of claim 1, wherein at least one of the one or more analysis systems determines the existence of an unacceptable spin track diagnostic condition in at least one of the one or more spin tracks based upon one or more diagnostic information values differing from an acceptable value.

8. The system of claim 1, wherein at least one of the one or more maintenance systems determines the existence of an unacceptable spin track maintenance condition in at least one of the one or more spin tracks based upon one or more diagnostic information values differing from an acceptable value.

9. The system of claim 3, wherein at least one of the one or more feedback control information systems determines the existence of an unacceptable spin track fabrication condition in at least one of the one or more spin tracks based upon one or more diagnostic information values differing from an acceptable value.

10. A computer readable medium having computer executable components, comprising:
    one or more analysis systems for analyzing diagnostic information associated with one or more spin tracks; and
    one or more maintenance systems for scheduling routine and/or special maintenance for the one or more spin tracks.

11. The computer readable medium of claim 10, further comprising:
    one or more control information systems for generating feedback control information to adapt one or more processing steps performed by the one or more spin tracks, wherein the feedback control information is based at least in part on diagnostic information generated by the one or more spin tracks.

12. A data packet adapted to be transmitted from a first computer process to a second computer process, comprising:
    data related to diagnostic information collected from one or more spin tracks.

13. A data packet adapted to be transmitted from a first computer process to a second computer process, comprising:
    data related to analysis performed on diagnostic information collected from one or more spin tracks.

14. A data packet adapted to be transmitted from a first computer process to a second computer process, comprising:
    data related to feedback control information for controlling one or more fabrication steps in one or more spin tracks.

15. A computer readable medium having stored thereon a data structure, comprising:
    a first data field containing first data related to diagnostic information collected from one or more spin tracks;
    a second data field containing second data derived from the first data field, wherein the second data relates to maintenance scheduled to be performed on the one or more spin tracks.

16. The computer readable medium of claim 15, further comprising:

a third data field containing third data derived from the first data field, wherein the third data relates to feedback control information related to the analysis of the first data field.

17. The system of claim 1, wherein the diagnostic information is stored in one or more databases.

18. The system of claim 1, wherein the diagnostic information is stored in an HTML document.

19. The system of claim 1, wherein the diagnostic information is stored in an XML document.

20. The system of claim 1, wherein the diagnostic information may be queried via one or more query languages.

21. The system of claim 1, wherein one or more components of the analysis system is located locally to one or more spin tracks.

22. The system of claim 2, wherein one or more components of the analysis system is located locally to one or more spin tracks.

23. The system of claim 1, wherein one or more components of the analysis system is located remotely from one or more spin tracks.

24. The system of claim 2, wherein one or more components of the analysis system is located remotely from one or more spin tracks.

25. The system of claim 1, wherein one or more components of the analysis system are located locally to one or more spin tracks and wherein one or more components of the analysis system are located remotely from one or more spin tracks.

26. The system of claim 2, wherein one or more components of the analysis system are located locally to one or more spin tracks and wherein one or more components of the analysis system are located remotely from one or more spin tracks.

27. The system of claim 1, wherein one or more components of the maintenance system are located locally to one or more spin tracks.

28. The system of claim 2, wherein one or more components of the maintenance system are located locally to one or more spin tracks.

29. The system of claim 1, wherein one or more components of the maintenance system are located remotely from one or more spin tracks.

30. The system of claim 2, wherein one or more components of the maintenance system are located remotely from one or more spin tracks.

31. The system of claim 1, wherein one or more components of the maintenance system are located locally to one or more spin tracks and wherein one or more components of the maintenance system are located remotely from one or more spin tracks.

32. The system of claim 2, wherein one or more components of the maintenance system are located locally to one or more spin tracks and wherein one or more components of the maintenance system are located remotely from one or more spin tracks.

33. The system of claim 3, wherein one or more components of the feedback control information system are located locally to one or more spin tracks.

34. The system of claim 3, wherein one or more components of the feedback control information system are located remotely from one or more spin tracks.

35. The system of claim 3, wherein one or more components of the feedback control information system are located locally to one or more spin tracks and wherein one or more components of the feedback control information system are located remotely from one or more spin tracks.

36. A method for remotely analyzing diagnostic information comprising:

collecting diagnostic information from one or more spin tracks;

transmitting the diagnostic information to an analyzer via data communication means;

analyzing the diagnostic information to produce analysis data related to the maintenance status of the one or more spin tracks; and producing maintenance schedule data for the one or more spin tracks.

37. The method of claim 36, further comprising:

scheduling special maintenance for the one or more spin tracks.

38. The method of claim 36, further comprising:

generating feedback control information for the one or more spin tracks.

39. The method of claim 36, further comprising:

storing the diagnostic information;

storing the analysis data; and storing the maintenance schedule data.

40. A method for remotely analyzing diagnostic information comprising:

means for collecting diagnostic information from one or more spin tracks;

means for transmitting the diagnostic information to an analyzer via data communication means;

means for analyzing diagnostic information in the analyzer to produce analysis data related to the maintenance status of the one or more spin tracks; and means for producing maintenance schedule data for the one or more spin tracks.

41. The method of claim 40, further comprising:

means for generating feedback control information for the one or more spin tracks.

* * * * *

UNITED STATES PATENT AND TRADEMARK OFFICE
CERTIFICATE OF CORRECTION

PATENT NO. : 6,845,345 B1
DATED : January 18, 2005
INVENTOR(S) : Bhanwar Singh et al.

It is certified that error appears in the above-identified patent and that said Letters Patent is hereby corrected as shown below:

<u>Title page,</u>
Item [54], Title, please correct title from "SYSTEM FOR MONITORING AND ANALYZING DIAGNOSTIC DATA OF SPIN TRACKS" to -- MAINTENANCE SCHEDULING EMPLOYING REMOTE ANALYSIS OF DIAGNOSTIC DATA --

Signed and Sealed this

First Day of March, 2005

JON W. DUDAS
*Director of the United States Patent and Trademark Office*